Patented Aug. 31, 1937

2,091,289

UNITED STATES PATENT OFFICE 2,091,289

PURIFICATION OF PHTHALIC ANHYDRIDE

Frank Porter, Syracuse, N. Y., assignor, by mesne assignments, to The Solvay Process Company, New York, N. Y., a corporation of New York No Drawing. Application December 31, 1934, Serial No. 759,973

10 Claims. (Cl. 260—123)

This invention relates to the purification of phthalic anhydride, particularly the crude product obtained by the catalytic oxidation of hydrocarbons such as naphthalene. Phthalic anhydride and more especially the products obtained in the above manner, are frequently contaminated with small quantities of organic impurities such as tarry matter, naphthoquinone, and other materials of a lower degree of oxidation than the phthalic anhydride. Although the phthalic anhydride may be separated from some of these impurities, in particular the higher molecular aggregates in the nature of tarry material, by fractional distillation, naphthoquinone possesses physical properties so closely similar to those of phthalic anhydride that separatory distillation or other physical separation methods are of little use in eliminating this impurity.

The naphthoquinone content of the usual crude phthalic anhydride product is small, but even traces of naphthoquinone impart a distinct odor to the product and hence are objectionable. To provide a phthalic anhydride product of good quality, it is therefore necessary to effect substantially complete elimination of naphthoquinone.

The present invention has as an object the removal of this and other undesirable impurities from phthalic anhydride in a simple and efficient manner and the preparation of a phthalic anhydride product which is substantially free from naphthoquinone and possesses an excellent color and odor. Further objects will be apparent from the following description of the invention.

In accordance with the present invention I subject the crude phthalic anhydride product containing naphthoquinone to reduction by intimate contact with a reducing agent such as a metal or hydrogen with or without the aid of a reduction catalyst. The conditions of reaction, for instance the temperature of the phthalic anhydride and the activity of the reducing agent should be controlled so that no substantial reduction of the phthalic anhydride takes place. Intimate contact of the material with hydrogen may be effected by bubbling gaseous hydrogen through liquid phthalic anhydride, or by spraying the liquid into the hydrogen or onto catalytic surfaces exposed to hydrogen, as by spraying it against the iron walls of a vessel containing hydrogen.

The reduction is preferably carried out by heating the phthalic anhydride in liquid phase with finely divided iron, or by bubbling hydrogen through the hot phthalic anhydride containing a reduction catalyst, for example iron or nickel; in either case no appreciable reduction of the phthalic anhydride occurs. The reduction step may be carried out in any of the ordinary refluxing vessels available. The vessel may be composed of iron, in which case the presence of a reducing agent in the liquid assists in preserving the equipment.

By subjecting the phthalic anhydride to the above treatment, the naphthoquinone present apparently is reduced to dihydroxy-naphthalene which reacts with an equimolar quantity of phthalic anhydride to produce a phthalein of high boiling point. After the naphthoquinone has been converted to the phthalic derivative, it may be readily removed from the main portion of the phthalic anhydride by a separatory distillation, the phthalic anhydride being recovered as distillate and the naphthoquinone reaction product being retained as residue from the distillation, along with tarry impurities originally present.

The still and condenser may be constructed of any suitable material, such as glass, iron, aluminum, stainless steel, etc. Since the product does not contain naphthoquinone, iron may be used without danger of contaminating the product with tarry material which otherwise might be formed.

The presence of sulfur tends to inhibit the reducing action of iron or the catalytic effect of iron or other metallic reduction catalysts in the hydrogen reduction process. Consequently, when sulfur is contained in the phthalic anhydride, it is necessary to employ substantially increased quantities of the metal, or at least to employ the metal in a form presenting a substantially increased surface area.

The following examples illustrate my improved purification method.

*Example 1.*—A crude phthalic anhydride product containing about 0.5% of 1,4-naphthoquinone as an impurity therein is heated at standard pressure to its boiling point (about 284° C.) in a vessel provided with a reflux condenser. To the boiling mixture about 1% of its weight of iron powder is added. The liquid phthalic anhydride is refluxed at its boiling point for about one hour. The iron powder is effectively agitated by the boiling liquid and in this manner is kept uniformly distributed through the liquid. After this refluxing step, the phthalic anhydride is distilled in a still equipped with a fractionating column. A colorless liquid distillate of pure phthalic anhydride substantially free from naphthoquinone is obtained.

*Example 2.*—Crude liquid phthalic anhydride containing around .014% of sulfur present as organic sulfur compounds and about 1.5% of naphthoquinone is introduced into a vessel provided with a reflux condenser and heated to about 280° C. About 1% by weight of a catalyst consisting of metallic nickel (obtained by reducing nickel oxide ($Ni_2O_3$) with hydrogen at 300° C. and standard pressure) is added. Hydrogen gas is bubbled vigorously through the hot liquid containing the catalyst, thereby providing agitation and subjecting impurities in the phthalic anhydride to reduction. The combined heating and reduction is continued for a period of about one hour. At the end of this period the liquid is subjected to separatory distillation in a still equipped with a fractionating column. As in Example 1, a colorless distillate of liquid phthalic anhydride is obtained substantially free from naphthoquinone and sulfur compounds.

The residue from the distillation in either Example 1 or Example 2 may be used again for treating further quantities of crude phthalic anhydride. When the metal ceases to serve effectively as a reducing agent or reduction catalyst, it may be revived by burning it and subjecting the resultant metal oxide to reduction with hydrogen.

As previously indicated a greater amount of catalyst is required when sulfur is present during the hydrogen reduction. Hence, provided the crude material is substantially free from sulfur, the reduction of naphthoquinone and production of a high boiling derivative therefrom may be accomplished as in Example 2 above, by heating the crude material for only ten minutes with only about 0.1% of finely divided iron as catalyst or with only the metal walls of an iron reaction vessel serving as the catalyst and by use of a somewhat longer heating period the reduction catalyst may even be dispensed with entirely.

I claim:

1. In the purification of phthalic anhydride containing naphthoquinone, the step which comprises heating the phthalic anhydride in intimate contact with a reducing agent sufficient to reduce the naphthoquinone but insufficient to reduce the phthalic anhydride whereby reduction of the naphthoquinone without substantial reduction of phthalic anhydride is effected.

2. The method of purifying crude phthalic anhydride containing naphthoquinone, which comprises heating the phthalic anhydride in liquid phase in intimate contact with gaseous hydrogen whereby naphthoquinone is converted to a high-boiling phthalic derivative, stopping the aforesaid conversion step before substantial reduction of phthalic anhydride is effected, and distilling off phthalic anhydride from said derivative.

3. In the purification of crude phthalic anhydride, the step which comprises heating the phthalic anhydride in liquid phase in intimate contact with hydrogen and a metallic reduction catalyst the amounts of the hydrogen and catalyst being sufficient to effect reduction of impurities more easily reduced than phthalic anhydride but insufficient to react with the phthalic anhydride.

4. The method of purifying phthalic anhydride containing naphthoquinone, which comprises heating the phthalic anhydride in molten condition at a temperature around 280° C. in contact with a metallic reduction catalyst which does not react with the phthalic anhydride and bringing hydrogen into intimate contact with said molten phthalic anhydride until said naphthoquinone is converted to a high-boiling phthalic derivative, stopping the aforesaid conversion step before substantial reduction of phthalic anhydride is effected, and thereafter distilling off phthalic anhydride from said derivative.

5. The method of purifying phthalic anhydride containing naphthoquinone, which comprises heating the phthalic anhydride in molten condition at a temperature around 280° C. in contact with a finely divided nickel catalyst and simultaneously bubbling hydrogen through said molten phthalic anhydride until said naphthoquinone is converted to a high-boiling phthalic derivative, stopping the aforesaid conversion step before substantial reduction of phthalic anhydride is effected, and thereafter distilling off phthalic anhydride from said derivative.

6. The method of purifying phthalic anhydride containing naphthoquinone, which comprises heating the phthalic anhydride in liquid phase to a temperature around 280° C. in contact with powdered iron until said naphthoquinone is converted to a high-boiling phthalic derivative, stopping the aforesaid conversion step before substantial reduction of phthalic anhydride is effected, and thereafter distilling off phthalic anhydride from said derivative.

7. The method of purifying crude phthalic anhydride containing naphthoquinone, which comprises heating the phthalic anhydride in liquid phase in contact with a solid, finely divided reducing metal sufficient to reduce the naphthoquinone present but insufficient to react with the phthalic anhydride whereby naphthoquinone is converted to a high-boiling phthalic derivative, and distilling off phthalic anhydride from said derivative.

8. The method of purifying phthalic anhydride containing naphthoquinone, which comprises heating the phthalic anhydride in liquid phase in contact with finely divided iron until said naphthoquinone is converted to a high boiling phthalic derivative and thereafter distilling off phthalic anhydride from said derivative.

9. The method of purifying phthalic anhydride containing naphthoquinone, which comprises heating the phthalic anhydride in liquid phase in contact with finely divided iron, obtained by reduction of finely divided iron oxide by hydrogen, until said naphthoquinone is converted to a high-boiling derivative and thereafter distilling off phthalic anhydride from said derivative.

10. In the purification of phthalic anhydride containing naphthoquinone, the method which comprises heating the phthalic anhydride in liquid phase in contact with finely divided iron until said naphthoquinone is converted to a high-boiling phthalic derivative and thereafter distilling off phthalic anhydride from said derivative, burning the finely divided iron and subjecting the resulting metal oxide to reduction with hydrogen, and using the finely divided iron thus produced for the purification of further quantities of phthalic anhydride as aforesaid.

FRANK PORTER.